(12) United States Patent
Madsen et al.

(10) Patent No.: US 12,233,366 B2
(45) Date of Patent: Feb. 25, 2025

(54) LIQUID FILTRATION MEDIA CONTAINING MELT-BLOWN FIBERS

(71) Applicant: Donaldson Company, Inc., Minneapolis, MN (US)

(72) Inventors: Mike J. Madsen, Chaska, MN (US); Brian D. Babcock, Columbus, TN (US)

(73) Assignee: Donaldson Company, Inc., Bloomington, MN (US)

( * ) Notice: Subject to any disclaimer, the term of this patent is extended or adjusted under 35 U.S.C. 154(b) by 894 days.

(21) Appl. No.: 17/360,859

(22) Filed: Jun. 28, 2021

(65) Prior Publication Data

US 2021/0322906 A1  Oct. 21, 2021

Related U.S. Application Data

(63) Continuation of application No. 14/238,436, filed as application No. PCT/US2012/050176 on Aug. 9, 2012, now abandoned.

(Continued)

(51) Int. Cl.
*B01D 39/16* (2006.01)
*B01D 39/18* (2006.01)
(Continued)

(52) U.S. Cl.
CPC ......... *B01D 39/1607* (2013.01); *B01D 39/16* (2013.01); *B01D 39/1623* (2013.01);
(Continued)

(58) Field of Classification Search
None
See application file for complete search history.

(56) References Cited

U.S. PATENT DOCUMENTS

| | | |
|---|---|---|
| RE28,102 E | 8/1974 | Mayhew |
| 3,849,241 A | 11/1974 | Butin et al. |

(Continued)

FOREIGN PATENT DOCUMENTS

| | | |
|---|---|---|
| CA | 2087773 | 7/1993 |
| CA | 2821528 | 5/2006 |

(Continued)

OTHER PUBLICATIONS

"First Office Action," for Chinese Patent Application No. 202010992944.7 mailed Sep. 27, 2021 (24 pages) with English Translation.

(Continued)

*Primary Examiner* — Clare M Perrin
(74) *Attorney, Agent, or Firm* — Pauly, DeVries Smith & Deffner LLC

(57) ABSTRACT

A filter and filter media configured and arranged for placement in a fuel stream is disclosed. The filter and filter media allow for filtering of liquid fuels, such as diesel fuel. In certain embodiments the filter media includes a media fiber, such as melt blown polyester; and a scaffold fiber, also such as melt blown polyester, having a larger diameter than the media fiber. The media and scaffold fibers combine to create a media structure having low solidity and relatively low compressibility, and which contain a pore structure that avoids premature fouling of the filter by fuel degradation products.

12 Claims, 6 Drawing Sheets

Related U.S. Application Data

(60) Provisional application No. 61/523,068, filed on Aug. 12, 2011.

(51) Int. Cl.
*F02M 37/22* (2019.01)
*B01D 24/00* (2006.01)
*B01D 35/00* (2006.01)

(52) U.S. Cl.
CPC .............. *B01D 39/18* (2013.01); *F02M 37/22* (2013.01); *B01D 24/007* (2013.01); *B01D 35/005* (2013.01); *B01D 2239/0216* (2013.01); *B01D 2239/1233* (2013.01)

(56) References Cited

U.S. PATENT DOCUMENTS

| | | | |
|---|---|---|---|
| 3,855,046 A | 12/1974 | Hansen et al. | |
| 3,959,421 A | 5/1976 | Weber et al. | |
| 4,100,324 A | 7/1978 | Anderson et al. | |
| 4,118,531 A | 10/1978 | Hauser | |
| 4,211,689 A | 7/1980 | Borman | |
| 4,215,682 A | 8/1980 | Kubik et al. | |
| 4,295,652 A | 10/1981 | Saito et al. | |
| 4,307,002 A | 12/1981 | Wagner et al. | |
| 4,415,727 A | 11/1983 | Toga et al. | |
| 4,419,993 A | 12/1983 | Petersen | |
| 4,659,609 A | 4/1987 | Lamers et al. | |
| 4,661,255 A * | 4/1987 | Aumann ................ D21F 11/04 210/491 | |
| 4,787,699 A | 11/1988 | Moulin | |
| 4,806,204 A | 2/1989 | Manfre et al. | |
| 4,843,247 A | 6/1989 | Yamazoe et al. | |
| 5,058,678 A | 10/1991 | Dill et al. | |
| 5,089,123 A | 2/1992 | DeVoe | |
| 5,108,820 A | 4/1992 | Kaneko et al. | |
| 5,132,225 A | 7/1992 | Dickakian | |
| 5,209,842 A | 5/1993 | Moor | |
| 5,271,883 A | 12/1993 | Timmons et al. | |
| 5,324,612 A | 6/1994 | Maeda et al. | |
| 5,336,552 A | 8/1994 | Strack et al. | |
| 5,378,632 A | 1/1995 | Solly et al. | |
| 5,382,400 A | 1/1995 | Pike et al. | |
| 5,411,576 A | 5/1995 | Jones et al. | |
| 5,458,767 A | 10/1995 | Stone | |
| 5,472,481 A | 12/1995 | Jones et al. | |
| 5,507,942 A | 4/1996 | Davis | |
| 5,580,459 A | 12/1996 | Powers et al. | |
| 5,620,779 A | 4/1997 | Levy et al. | |
| 5,639,541 A | 6/1997 | Adam | |
| 5,652,048 A | 7/1997 | Haynes et al. | |
| 5,706,804 A | 1/1998 | Baumann et al. | |
| 5,711,767 A | 1/1998 | Gande et al. | |
| 5,759,926 A | 6/1998 | Pike et al. | |
| 5,908,598 A | 6/1999 | Rousseau et al. | |
| 5,916,677 A | 6/1999 | Chen et al. | |
| 5,969,237 A | 10/1999 | Jones et al. | |
| 5,972,063 A | 10/1999 | Dudrey et al. | |
| 5,997,739 A | 12/1999 | Clausen et al. | |
| 6,087,662 A | 7/2000 | Wilt et al. | |
| 6,090,731 A | 7/2000 | Shipp et al. | |
| 6,200,669 B1 | 3/2001 | Marmon et al. | |
| 6,267,252 B1 | 7/2001 | Amsler | |
| 6,322,604 B1 | 11/2001 | Midkiff | |
| 6,414,085 B1 | 7/2002 | Karas et al. | |
| 6,585,838 B1 | 7/2003 | Mullins et al. | |
| 7,049,254 B2 | 5/2006 | Bansal et al. | |
| 7,137,510 B1 | 11/2006 | Klein et al. | |
| 7,250,126 B2 | 7/2007 | Haberkamp et al. | |
| 7,309,372 B2 | 12/2007 | Kahlbaugh et al. | |
| 7,314,497 B2 | 1/2008 | Kahlbaugh et al. | |
| 7,468,335 B2 | 12/2008 | Imes et al. | |
| 7,485,170 B2 | 2/2009 | Wang et al. | |
| 7,754,041 B2 | 7/2010 | Brandner et al. | |
| 7,901,572 B2 | 3/2011 | Sato et al. | |
| 7,938,963 B2 | 5/2011 | Klein et al. | |
| 8,057,567 B2 | 11/2011 | Webb et al. | |
| 8,173,013 B2 | 5/2012 | Sato et al. | |
| 8,268,033 B2 | 9/2012 | Rogers et al. | |
| 8,512,435 B2 | 8/2013 | Rogers et al. | |
| 8,608,817 B2 | 12/2013 | Wertz et al. | |
| 8,689,985 B2 | 4/2014 | Bates et al. | |
| 9,056,268 B2 | 6/2015 | Jones et al. | |
| 10,226,723 B2 | 3/2019 | Jones et al. | |
| 11,565,206 B2 | 1/2023 | Jones et al. | |
| 2003/0045192 A1 | 3/2003 | Midkiff et al. | |
| 2003/0080046 A1 | 5/2003 | Ito | |
| 2005/0016905 A1 | 1/2005 | Lindow | |
| 2005/0023201 A1 | 2/2005 | Sato et al. | |
| 2005/0160711 A1 | 7/2005 | Yang | |
| 2005/0223629 A1 | 10/2005 | Sutkowski et al. | |
| 2006/0096263 A1 * | 5/2006 | Kahlbaugh ........ B01D 39/2089 55/528 | |
| 2006/0229222 A1 | 10/2006 | Muller et al. | |
| 2006/0266693 A1 | 11/2006 | Yoshida et al. | |
| 2006/0266701 A1 | 11/2006 | Dickerson et al. | |
| 2006/0277877 A1 | 12/2006 | Shields et al. | |
| 2007/0039300 A1 | 2/2007 | Kahlbaugh et al. | |
| 2007/0075015 A1 | 4/2007 | Bates et al. | |
| 2007/0084776 A1 | 4/2007 | Sasur | |
| 2007/0254798 A1 | 11/2007 | Addiego et al. | |
| 2008/0073296 A1 | 3/2008 | Dema et al. | |
| 2008/0105626 A1 | 5/2008 | Jones et al. | |
| 2008/0135469 A1 | 6/2008 | Fremont et al. | |
| 2008/0145500 A1 | 6/2008 | Stournaras et al. | |
| 2008/0149561 A1 | 6/2008 | Chu et al. | |
| 2008/0295394 A1 | 12/2008 | Furuta et al. | |
| 2008/0308488 A1 | 12/2008 | Iwakata et al. | |
| 2009/0050578 A1 | 2/2009 | Israel et al. | |
| 2009/0120048 A1 | 5/2009 | Wertz et al. | |
| 2010/0038304 A1 | 2/2010 | Chen et al. | |
| 2010/0072126 A1 | 3/2010 | Tsujimoto et al. | |
| 2010/0291213 A1 | 11/2010 | Berrigan et al. | |
| 2011/0049041 A1 | 3/2011 | Yonemoto | |
| 2011/0079553 A1 * | 4/2011 | Thomson ........... B01D 39/1623 210/489 | |
| 2011/0162337 A1 | 7/2011 | Healey et al. | |
| 2011/0198280 A1 | 8/2011 | Jones et al. | |
| 2012/0292252 A1 * | 11/2012 | Chase .................. B01D 46/003 585/818 | |
| 2013/0340613 A1 | 12/2013 | Krupnikov et al. | |
| 2014/0326661 A1 | 11/2014 | Madsen et al. | |
| 2016/0038865 A1 | 2/2016 | Jones et al. | |
| 2017/0225105 A1 | 8/2017 | Rogers et al. | |
| 2019/0270040 A1 | 9/2019 | Jones et al. | |
| 2023/0226475 A1 | 7/2023 | Jones et al. | |

FOREIGN PATENT DOCUMENTS

| | | |
|---|---|---|
| CN | 1364095 | 8/2002 |
| CN | 1711384 | 12/2005 |
| CN | 101098741 | 1/2008 |
| CN | 101553660 | 10/2009 |
| CN | 101939072 | 1/2011 |
| CN | 102753246 | 10/2012 |
| CN | 103874533 | 6/2014 |
| CN | 112316564 | 2/2021 |
| DE | 934889 | 11/1955 |
| DE | 4344819 | 7/1994 |
| DE | 102010036337 | 3/2011 |
| EP | 0245512 | 11/1987 |
| EP | 0397403 | 11/1990 |
| EP | 0947577 | 10/1999 |
| EP | 1894609 | 3/2008 |
| EP | 2065081 | 6/2009 |
| EP | 2741838 | 6/2014 |
| GB | 847592 | 9/1960 |
| GB | 2404347 | 2/2005 |
| IN | 1884CHENP2014 A | 5/2015 |
| JP | H03175141 | 7/1991 |
| JP | 05261223 | 10/1993 |
| JP | 2002028418 | 1/2002 |
| JP | 2002292223 | 10/2002 |

(56) References Cited

FOREIGN PATENT DOCUMENTS

| | | | | |
|---|---|---|---|---|
| JP | 2003047957 | 2/2003 | | |
| JP | 2003236321 | 8/2003 | | |
| JP | 2004275892 | 10/2004 | | |
| JP | 2005048721 | 2/2005 | | |
| JP | 2005152769 | 6/2005 | | |
| JP | 2006061789 | 3/2006 | | |
| JP | 2006521497 | 9/2006 | | |
| JP | 2006326515 | 12/2006 | | |
| JP | 2007117945 | 5/2007 | | |
| JP | 3134943 | 8/2007 | | |
| JP | 2007533849 | 11/2007 | | |
| JP | 2008000652 | 1/2008 | | |
| JP | 2008518772 | 6/2008 | | |
| JP | 2008221138 | 9/2008 | | |
| JP | 2008274806 | 11/2008 | | |
| JP | 2009517326 | 4/2009 | | |
| JP | 2009532195 | 9/2009 | | |
| JP | 2010019151 | 1/2010 | | |
| JP | 2011045825 | 3/2011 | | |
| WO | WO9634673 | 11/1996 | | |
| WO | WO0107143 | 2/2001 | | |
| WO | WO03093557 | 11/2003 | | |
| WO | WO2007027669 | 3/2006 | | |
| WO | WO2006052732 | 5/2006 | | |
| WO | WO-2006052732 | A2 * | 5/2006 | ........... B01D 39/163 |
| WO | WO2008086897 | 7/2008 | | |
| WO | WO2008103736 | 8/2008 | | |
| WO | WO2008121526 | 10/2008 | | |
| WO | WO2009002612 | 12/2008 | | |
| WO | 2009021028 | 2/2009 | | |
| WO | WO2010009043 | 1/2010 | | |
| WO | WO2010088403 | 8/2010 | | |
| WO | WO2011028661 | 3/2011 | | |
| WO | WO2011100712 | 8/2011 | | |
| WO | WO2013025445 | 2/2013 | | |

OTHER PUBLICATIONS

"Response to Final Rejection," mailed on Jul. 16, 2021 for U.S. Appl. No. 16/298,000, submitted via EFS-Web on Oct. 18, 2021, 8 pages.
"Technical Examination Report," for Brazilian Patent Application No. 122021009061-0 mailed Aug. 16, 2021 (6 pages) with English Translation.
"Final Office Action," for U.S. Appl. No. 16/298,000 (mailed Nov. 23, 2021 (20 pages).
"Response to Final Rejection", mailed on Nov. 23, 2021 for U.S. Appl. No. 16/298,000, submitted via EFS-Web on Feb. 23, 2021, 10 pages.
"Communication pursuant to Article 94(3) EPC," for European Patent Application No. 20156252.7 mailed Feb. 20, 2024 (5 pages).
"Non-Final Office Action," for U.S. Appl. No. 18/094,029 mailed Jun. 4, 2024 (31 pages).
"Response to Final Rejection," mailed on May 31, 2022 for U.S. Appl. No. 16/298,000, submitted via EFS-Web on Aug. 31, 2022, 8 pages.
"Decision of Rejection," for Brazilian Patent Application No. 122021009061-0 mailed Mar. 28, 2022 (7 pages) with English Translation.
"Final Office Action," for U.S. Appl. No. 16/298,000 mailed May 31, 2022 (17 pages).
"Decision of Rejection," for Brazilian Patent Application No. 1120140033536 mailed Dec. 2, 2020 (4 pages) English Translation Only.
"Examination Report," for Indian Patent Application No. 1884CHENP2014 mailed Mar. 15, 2019 (7 pages).
"Examination Report," for Indian Patent Application No. 2498/KOLNP/2012 mailed Dec. 28, 2018 (6 pages).
File History for European Patent Application No. 20156252.7 downloaded Aug. 20, 2021 (160 pages).
File History for European Patent Application No. 11704707.6 downloaded Aug. 20, 2021 (700 pages).
File History for U.S. Appl. No. 14/717,854 downloaded Aug. 20, 2021 (373 pages).
File History for U.S. Appl. No. 16/298,000 downloaded Aug. 20, 2021 (393 pages).
File History for U.S. Appl. No. 13/027,119 downloaded Aug. 20, 2021 (338 pages).
File History for European Patent Application No. 16154980.3 downloaded Aug. 20, 2021 (206 pages).
File History for European Patent Application No. 12750664.0 downloaded Aug. 20, 2021 (1820 pages).
File History for U.S. Appl. No. 14/238,436 downloaded Aug. 20, 2021 (738 pages).
"First Office Action," for Chinese Patent Application No. 201180008682.5 mailed Apr. 28, 2014 (14 Pages) with English translation.
"First Office Action," for Chinese Patent Application No. 201710669390.5 mailed May 7, 2019 (15 pages) with English Translation.
"International Preliminary Report on Patentability," for PCT/US2011/024791, mailed Aug. 23, 2012 (10 pages).
"International Preliminary Report on Patentability," for PCT/US2012/050176, mailed Feb. 27, 2014 (10 pages).
"International Search Report and Written Opinion," for PCT/US2012/050176, mailed May 28, 2013 (14 pages).
"Invitation to Pay Additional Fees," for PCT/US2012/050176 mailed Feb. 19, 2013 (6 pages).
"Non-Final Office Action," for Japanese Patent Application No. 2012-553085, mailed Jul. 10, 2015 (7 pages) with English Summary.
"Office Action," for Brazilian Patent Application No. 1120120200992 mailed Jan. 29, 2021 (7 pages) with English Translation.
"Office Action," for Brazilian Patent Application No. BR1120120200992 mailed Sep. 8, 2020 (7 pages) with English Translation.
"Office Action," for Japanese Patent Application No. 2018126319 mailed Jun. 24, 2019 (10 pages) with English Summary.
"Office Action," for Japanese Patent Application No. 2020-026380 mailed Apr. 5, 2021 (7 pages) with English Summary.
"Office Action," for Korean Patent Application No. 10-2014-7006150 mailed Apr. 27, 2020 (6 pages) with English Translation.
"Office Action," for Korean Patent Application No. 10-2014-7006150 mailed Jul. 31, 2019 (23 pages) with English Translation.
"Office Action," for Korean Patent Application No. 10-2014-7006150 mailed Nov. 29, 2018 (11 pages).
"Preliminary Office Action," for Brazilian Patent Application No. BR112014003353-6 dated Jul. 30, 2019 (8 pages) with English translation.
"Second Office Action," for Chinese Patent Application No. 201180008682.5, mailed Mar. 20, 2015 (12 pages) with English translation.
"Second Office Action," for Chinese Patent Application No. 201280043992.5, mailed Dec. 1, 2015 (15 pages) with translation.
"Second Office Action," for Chinese Patent Application No. 201710669390.5 mailed Dec. 23, 2019 (16 pages) with English Translation.
"Technical Examination Report," for Brazilian Patent Application No. BR1120140033536 mailed Aug. 14, 2020 (4 pages) English Translation Only.
"Third Office Action," for Chinese Patent Application No. 201710669390.5 mailed Apr. 9, 2020 (10 pages) with English Translation.
First Office Action for Chinese Patent Application No. 201610090269.2 mailed Apr. 20, 2017 (14 pages) with English translation.
First Office Action for Japanese Patent Application No. 2016-150374 mailed Oct. 6, 2017 (11 pages) with English translation.
Fourth Office Action for Chinese Patent Application No. 201280043992.5 mailed Feb. 8, 2017 (4 pages), English translation.
International Search Report and Written Opinion for PCT/US2011/024791, mailed Jul. 11, 2011 (15 pages).
Notice of Opposition for European Patent Application No. 12750664.0 on behalf of CLARCOR Inc., mailed Feb. 14, 2017 (16 pages).

(56) References Cited

OTHER PUBLICATIONS

Notice of Opposition for European Patent Application No. 12750664.0 on behalf of MAHLE International GmbH, mailed Feb. 14, 2017 (22 pages) with English translation.
Notice of Opposition for European Patent Application No. 12750664.0 on behalf of MANN+HUMMEL International Gmbh & Co. KG, mailed Feb. 14, 2017 (60 pages) with English translation.
Office Action for Chinese Patent Application No. 201280043992.5 mailed on Jan. 29, 2015 (17 pages) with English translation.
Second Office Action for Chinese Patent Application No. 201610090269.2 mailed Dec. 5, 2017 (12 pages).
Third Office Action for Chinese Patent Application No. 201280043992.5 mailed Aug. 10, 2016 (19 pages) with English translation.
Beaver, Bruce D., et al. "Kinetic Study of the Oxygenation of 2,5-Dimethylpyrrole. A Model Compound Study Designed to Probe Initiation of the Oxidative Degradation of Petroleum Products," Energy & Fuels, 1994, vol. 8, No. 2, 455-462.
Cooney, John V., et al."Oxygen absorption by 2,5-dimethylpyrrole doped shale diesel fuel," Fuel, Mar. 1986, vol. 65, p. 433-436.
Ellison, Christopher J., et al. "Melt Blown Nanofibers: Fiber Diameter Distributions and Onset of Fiber Breakup," Polymer 48 (2007), pp. 3306-3316 (11 pages).
Frankenfeld, John W., et al. "Deposit Formation from Deoxygenated Hydrocarbons. 4. Studies in Pure Compound Systems," Industrial & Engineering Chemistry Product Research and Development, 1980, vol. 19 (1), pp. 65-70.
Frankenfeld, John W., et al. "Storage Stability of Synfuels fro Oil Shale. 2. Effects of Nitrogen Compound Type and the Influence of Other Nonhydrocarbons on Sediment Formation in Model Fuel Systems," Industrial & Engineering Chemistry Product Research and Development, 1983, vol. 22 (4), pp. 615-621.
Frankenfeld, John W., et al. "Storage Stability of Synfuels from Oil Shale. 1. General Features of Sediment Formation in Model Fuel Systems," Industrial & Engineering Chemistry Product Research and Development, 1983, vol. 22, pp. 608-614.
Frankenfeld, John W., et al. "Storage Stability of Synfuels from Oil Shale. 3. Studies with Actual Shale-Derived Middle Distillates," Industrial & Engineering Chemistry Product Research and Development, 1983, vol. 22 (4), pp. 622-627.
Loeffler, M. Constance"Role of nitrogen- and sulphur-containing compounds in the ageing of liquid fuels," Fuel, Aug. 1985, vol. 64, p. 1047-1053.
Mushrush, George W., et al. "Chemical Basis of Instability of Shale-Derived Middle Distillate Fuels: A Model Study of the Interactive Effects between 2,5-Dimethylpyrrole and 3-Methylindole with Sulfonic and Carboxylic Acids," Energy & Fuels, 1991, vol. 5, No. 5, 749-753.
Reddy, K. T., et al. "Degradation Mechanisms of n-Dodecane with Sulfur and Nitrogen Dopants During Thermal Stressing," J. Propulsion, 1989, vol. 5, No. 1, pp. 6-13 (8 pages).
Simmonds, Glen E., et al."Designing Nonwovens to Meet Pore Size Specifications," Journal of Engineered Fibers and Fabrics, vol. 2, Issue 1, 2007 (15 pages).
Taylor, W. F., et al. "Deposit Formation from Deoxygenated Hydrocarbons. 3. Effects of Trace Nitrogen and Oxygen Compounds," Industrial & Engineering Chemistry Product Research and Development, 1978, vol. 17, No. 1, pp. 86.90 (5 pages).
"Communication Pursuant to Article 94(3) EPC," for European Patent Application No. 16154980.3 mailed Feb. 23, 2023 (4 pages).
"Office Action," for Brazilian Patent Application No. BR1120140033536 mailed Jul. 16, 2024 (13 pages) with English translation.
"Response to Non-Final Rejection," mailed on Jun. 4, 2024, for U.S. Appl. No. 18/094,029, submitted via Patent Center on Oct. 3, 2024, 8 pages.
"Final Rejection," mailed on Nov. 12, 2024, for U.S. Appl. No. 18/094,029, 9 pages.

\* cited by examiner

LIQUID FILTRATION MEDIA CONTAINING MELT-BLOWN FIBERS

This application is a continuation of U.S. application Ser. No. 14/238,436, filed Jul. 28, 2014, which is a national stage application under 35 U.S.C. 371 of PCT International Patent Application No. PCT/US2012/050176, filed Aug. 9, 2012, and claims the benefit of U.S. Provisional Application Ser. No. 61/523,068, filed on Aug. 12, 2011, the disclosures of which are incorporated herein by reference in their entireties.

FIELD OF THE INVENTION

The present invention is directed to filtration media, filter elements, and methods of filtering liquid fuels. In particular, the invention is directed to filtration media for the removal of fuel degradation products (FDPs) and other contaminants from liquid fuels.

BACKGROUND

Liquid fuels, such as diesel fuel, are used in internal combustion engines of various configurations and sizes. Such fuels must generally be filtered so as to remove particulate contaminants, which can otherwise create significant problems in engine performance and can result in damage to the engine. Filter media for removal of these particulate contaminants has generally been required to remove very high percentages of particles, necessitating use of filter media with tight pore structures. Without such tight pore structures, unacceptable levels of particles can pass through the filter media and detrimentally affect engine performance.

One media currently used for removal of particulate contaminants from fuel streams is melt-blown media. Although melt-blown media can perform adequately in removing particulate contaminants from liquid fuels, the melt-blown media can readily foul from buildup of contaminants other than traditional particulate contaminants. This premature fouling appears to be particularly pronounced in situations where fuel undergoes repeated heating and cooling cycles, such as in common rail systems used on many diesel engines. In such systems diesel fuel is pumped from a fuel tank at high pressure along a common conduit (or rail) that is connected to multiple fuel injectors. Some of the diesel fuel passes through the fuel injectors and is combusted, but the remainder is delivered back to the fuel tank at an increased temperature as a result of travelling down the common rail through portions of the hot diesel engine. Once back in the tank the fuel rapidly cools. Repeated cycles of heating and cooling of the fuel are believed to contribute in the production of fuel degradation products that accelerate fouling of traditional fuel filter media.

In addition to filter-clogging materials generated as a result of heating and cooling cycles, additional sources of contaminants that can reduce fuel filter performance include ingredients found in various biodiesel mixtures. Although often distinct in origin from the fuel degradation products formed during heating and cooling cycles, these contaminants can also contribute to significant reductions in fuel filter life by accumulating on the filter media. Finally, even normal aging of fuel, especially when it occurs at heightened temperatures, can result in production of fuel contaminants that further limit fuel filter life due to fouling and clogging of filter media earlier than would otherwise be expected if only hard particle contaminants were present.

Therefore, a substantial need exists for filtration media, filter elements, and filtration methods that can be used for removing contaminant materials from liquid fuel streams.

SUMMARY OF THE INVENTION

The present invention is directed to filter media configured and arranged for placement in a fluid fuel stream, to filter elements manufactured using the filter media, and to methods of filtering fuel streams. The filter media and elements are configured for applications where fuel can contain various other contaminants besides conventional hard particles. These additional contaminants can include (for example) waxes, asphaltenes, sterol glucosides, steryl glucosides, sterol glycosides, and various fuel degradation products (FDPs). Collectively, these additional contaminants can be referred to as fuel contamination products (FCPs). For diesel fuel filtration, in particular, the filter media is especially configured to remove fuel degradation products (FDPs), as well as similar fuel contamination products (FCPs).

In a first example embodiment, the filter media comprises an upstream layer of filter media and a downstream layer of filter media. The upstream layer of filter media contains melt blown polymeric fibers, such as polyester fibers. The downstream layer of filter media comprises cellulose fibers. In this example embodiment, the upstream layer of media containing melt blown fibers can be laminated to the downstream cellulose media. The upstream layer of media removes fuel degradation products in a manner such that filter life is preserved, or even extended, relative to prior art filter media.

The downstream cellulose layer serves a dual role as a support layer for the upstream filter layer, while also functioning to remove hard particles from the fuel stream. The upstream removal of the fuel degradation products avoids fouling of the downstream cellulose layer with the fuel degradation products, thereby allowing the downstream cellulose layer to capture hard particles without premature fouling, despite a tight pore structure. In addition, in certain embodiments the downstream cellulose layer can be constructed with a tighter pore structure than would otherwise be possible without the upstream layer (or layers) of media containing melt blown fibers, because the upstream layer (or layers) remove fuel degradation products (or fuel contaminant products) that would otherwise prematurely foul the tighter pore structures.

More generally, the invention is directed to various filter constructions that allow for removal of contaminants such as fuel degradation products and other fuel contamination products. Such filter constructions can comprise, for example, one or more areas of filter media containing a mixture of at least two types of fibers: (1) a media fiber and (2) a scaffold fiber. Media fiber is generally that fiber that provides primary filtration properties to the media, such as controllable pore size, permeability and efficiency. The media fiber used in accordance with the invention may be, for example, melt blown fiber, glass fiber or carbon fiber. The scaffold fiber may be, for example, a melt blown or bicomponent fiber. Suitable melt blown fibers include, in particular, polyester fibers.

The scaffold fiber provides support for the media fiber, and adds improved handling, adds greater strength, and results in lower compressibility to the media. The use of the scaffold fiber reduces compressibility, and allows for lower solidity, increases tensile strength and improves bonding of media fiber such as melt blown fiber or glass fiber and other sub-micron fiber materials that are added to the media layer or filter element.

In general the media fiber has a much smaller diameter than the scaffold fiber. In example embodiments the media fiber has an average diameter less than 5 microns, while the scaffold fiber has an average diameter greater than 5 microns. More typically, the media fiber will have an average diameter from 0.1 to 20 microns, and optionally from 0.1 to 15 microns. In some implementations the media fiber will have an average diameter from 0.4 to 12 microns, and in some implementations from 0.4 to 6.5 microns. Media fibers with an average diameter of less than 10 microns, less than 7.5 microns, less than 6.5 microns, and less than 5 microns are often desirable.

The scaffold fiber will typically have a diameter from 5 to 40 microns, more typically from 7 to 20 microns, and often from 10 to 14 microns. In certain implementations the scaffold fiber will have an average diameter of greater than 5 microns, greater than 7 microns, greater than 10 microns, greater than 20 microns, or greater than 30 microns. It will be noted that the diameter of both the media fibers and the scaffold fibers can be variable. In some cases the fiber diameters will vary along their lengths, while more commonly multiple different fibers of various diameters will be incorporated. It will be understood that, as used herein, fiber diameters are based upon average fiber diameters for the fibers present in the media.

A further characteristic of filter media made in accordance with the present invention, and in particular that portion of the media associated with sequestering FDPs (and related contaminants), is that the media typically has a relatively low solidity level. As used herein, solidity is the solid fiber volume divided by the total volume of the filter medium at issue, usually expressed as a percentage. In a typical implementation, solidity of the filter media associated with sequestering FDPs is less than 15 percent, more typically less than 12 percent, and more frequently less than 10 percent. In certain embodiments the solidity is less than 9 percent, less than 8 percent, or less than 7 percent.

An additional characteristic of the filter media made in accordance with the present invention is that it is relatively incompressible, especially relative to the solidity of the media. In a first example embodiment, the filter media has a compressibility of less than 40 percent at a pressure of 1.24 kg/cm$^2$. In other implementations the filter media has a compressibility of less than 30 percent at a pressure of 1.24 kg/cm$^2$, less than 20 percent at a pressure of 1.24 kg/cm$^2$, and less than 10 percent at a pressure of 1.24 kg/cm$^2$. It will thus be understood that the filter media of the present invention, at least that portion of the media most suitable for FDP removal, will typically have a relatively low solidity as well as a relatively low compressibility (or high stiffness).

The pore structures of the media provide further metrics by which the properties of the media associated with sequestering FDPs can be measured. In general, it is possible to characterize the properties of a porous media in terms of such parameters as mean flow pore, mode flow pore, and max flow pore. In accordance with the teachings of the present invention, it is desirable in general to have at least a portion of the media with small mean flow pores, while also having a large max flow pore.

The ratio of max pore size to mean flow pore is often at least 2.5, optionally at least 5.0, and in some implementations greater than 7.5. In certain embodiments, where the mean flow pore is very small and the max flow pore is relatively high, this ratio may be greater than 10.0, and optionally greater than 12.5 or 15. High ratios of the max flow pore to the mean flow pore reflect a wider pore size distribution, which can provide for reduced fouling from FDPs (and related) contaminants.

The media can also be selected to have a favorable pore size distribution, as measured by the ratio of pore sizes at the 15.9$^{th}$ percentile to that at the 50th percentile, which is geometric standard deviation for a lognormal distribution (a distribution which is normal for the logarithm transformed value). While the media pore size distribution is not necessarily lognormal, the ratio is employed here to approximate the geometric standard deviation of the pore size distribution. Unless otherwise stated, the geometric standard deviation mentioned below will refer to the ratio defined above. The geometric standard deviation is analogous to the slope of the curve of pore diameter plotted against cumulative pore volume. A geometric standard deviation of 1.0 gives a single pore size, while a larger geometric standard deviation reflects a broadening of the pore distribution. Thus, a geometric standard deviation of 1.2 reflects a narrow distribution, and a geometric standard deviation of 2.0 indicates a meaningfully broader distribution. A geometric standard deviation of 2.5 is a relatively broad distribution. A geometric standard deviation of 3.0 is a very broad distribution. Generally, the upstream filter material of the present invention containing media fiber and scaffold fiber will have a geometric standard deviation of greater than 2.0, more typically greater than 3.0, and in some implementations greater than 4.0.

As noted above, filter media made in accordance with the present invention is often comprised of two or more layers: an upstream filter material (containing media fiber and scaffold fiber, such as: melt blown fibers; glass fiber and bicomponent fibers, glass and melt blown fibers; or melt blown fibers and bicomponent fibers) is desirably combined with a downstream filter material. This downstream filter material is generally selected for favorable removal of particulate contaminants. The downstream material may comprise, for example, cellulose fiber.

In some embodiments, the mode pore size of the upstream portion is greater than the mode pore size of the downstream portion. For example, the mode pore size of the upstream portion (bicomponent/glass) may be at least 20 percent or at least 40 percent greater than the mode pore size of the downstream portion (cellulose media). In another embodiment, the mode pore size of the upstream portion is at least 20 percent greater than the mode pore size of the downstream portion; and the mean flow pore size of the upstream portion is less than 90 percent of the mean pore flow size of the downstream portion. In some embodiments, the mode pore size of the upstream portion is greater than the mode pore size of the downstream portion. For example, the mode pore size of the upstream portion may be at least 40 percent greater or at least 60 percent greater than the mode pore size of the downstream portion. In some embodiments, the mean flow pore size of the upstream portion is less than the mean pore flow size of the downstream portion. For example, the mean flow pore size of the upstream portion may be less than 70 percent or less than 50 percent of the mean pore flow size of the downstream portion.

It will be appreciated that the downstream portion may contain fiber having an average diameter or cross-section greater than the average diameter of the media fiber in the upstream portion.

Throughout this specification descriptions are provided as to the properties of the various portions of the filter media. In particular, properties are described for filter media having specific attributes, such as fiber diameter, solidity, compressibility, mean flow pore, mode pore flow, and max pore. It will be understood that media made in accordance with the present invention will often show unintentional variability in these properties, such as variability along a media web, as well as unintentional variability along the thickness or depth of a sheet of media. In addition, there can be intentional variation of the properties of the filter media, such as by providing multiple layers of media with intentionally different properties, or by providing a media with a gradient construction such that media properties gradually change along the depth of the media. It will be understood that such unintentional variability, as well as intentional variation, are intended to be within the scope of the present invention.

The above summary of the present invention is not intended to describe each discussed embodiment of the present invention. This is the purpose of the figures and the detailed description that follows.

FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed in part to filter media and filter elements for the removal of contaminant material from a liquid fuel stream. The filter elements and media are configured for removal of additional contaminants besides hard particles, these additional contaminants including (for example) waxes, asphaltenes, sterol glucosides, steryl glucosides, sterol glycosides, and fuel degradation products—collectively referred to as fuel contamination products. The filter elements and media allow for improved filter performance and longevity.

Although existing fuel filtration media can perform adequately in removing particulate contaminants from liquid fuels, the existing media can prematurely foul by buildup of contaminants other than traditional particulates. This premature fouling appears to be particularly pronounced in situations where fuel undergoes repeated heating and cooling cycles, such as in common rail systems used on many diesel engines.

Figure 1:
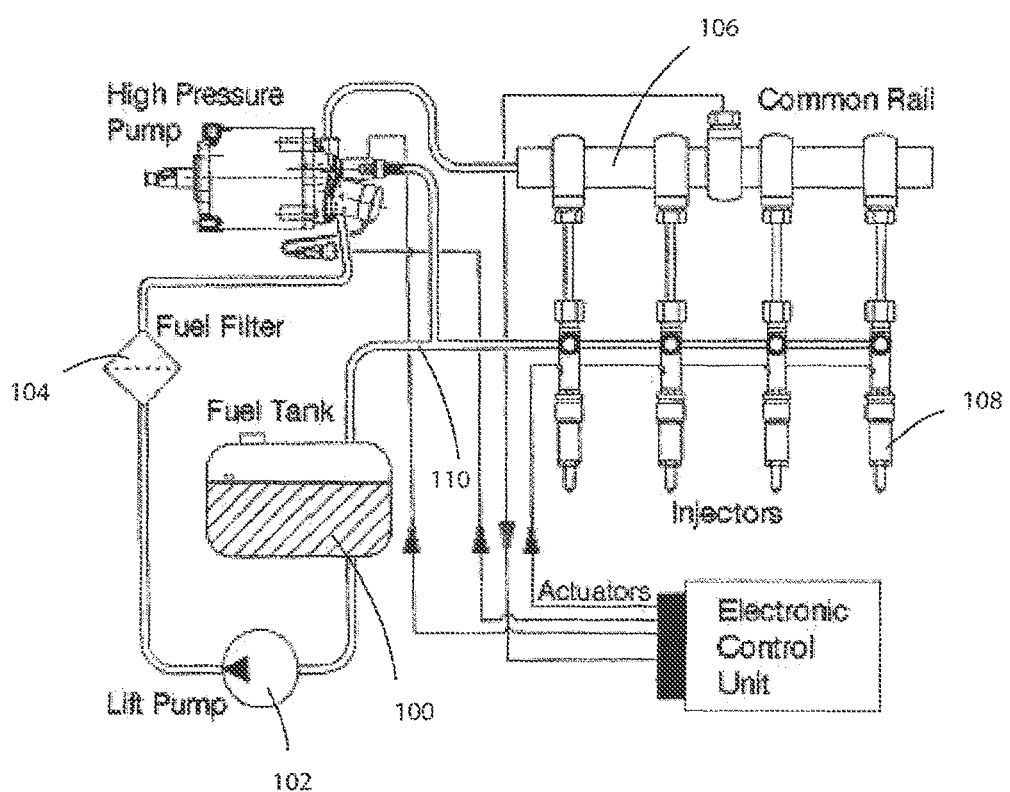
FIG. 1 is a schematic diagram of a fuel system for a diesel engine.

FIG. 1 is a schematic diagram of a common rail fuel system for a diesel engine. In FIG. 1, a fuel tank 100 is in fluid communication with a fuel pump 102 and fuel filter 104. Fuel is pumped from the fuel tank 100 through the filter 104, and then into a common rail 106 that serves as a manifold from which the diesel fuel is distributed to a plurality of injectors 108. Some of the fuel passes through the injectors 108 into combustion chambers, but excess fuel is allowed to flow back by way of return line 110 to the fuel tank 100. The fuel that is delivered back to the fuel tank is typically returned at an increased temperature as a result of travelling down the common rail through portions of the hot diesel engine. The fuel cools upon return to the fuel tank. In this manner portions of the fuel in the tank are continuously being heated and cooled whenever the engine is running.

Repeated cycles of heating and cooling of the fuel are believed to result in the production of fuel degradation products (FDPs). The FDPs can quickly accumulate on traditional fuel filtration media, resulting in premature fouling of the media. Such fouling can occur, for example, on melt blown polyester filter media, as well as on cellulose filter media. The fouling occurs as the FDPs, and potentially other fuel contaminant products (such as various waxes, asphaltenes, sterol glucosides, steryl glucosides, sterol glycosides) build up upon the filter media, causing plugging of the pores and premature failure.

The present invention overcomes the shortcoming of the prior art by providing a media construction that removes fuel contaminants in a manner such that their impact on filter performance and filter life can be limited. In particular, the present invention provides one or more layers or areas of media that effectively sequester contaminants such as FDPs, while being constructed to avoid becoming prematurely plugged. By effectively sequestering the FDPs, other components within the filter (including in some cases other layers within a multi-layered media) avoid premature plugging. The result is a longer life, better performing filter media and filter element.

In an example embodiment of the invention, the filter media comprises various sized melt blown fibers laminated on the upstream side of cellulose media, with the cellulose also serving a dual role as a hard particle filter and a support for the thermally bonded glass. The melt blown media functions to remove the FDPs in a fashion such that the FDPs are removed while premature plugging of the cellulose layer is avoided. This improved performance is achieved, in part, by selecting the a fiber mixture so that the media has a relatively low solidity, while retaining a relatively low compressibility. Typically some of the fibers are relatively thin and in high concentrations while other fibers are relatively thick and in lower concentrations, result in a media having small mean flow pore sizes, but also typically relatively high maximum pore sizes.

The use of a media that has relatively low solidity and low compressibility, while also having a small mean flow pore size but a high maximum flow pore size, results in a media construction that effectively removes FDP compounds without premature plugging. Preferred materials for the media fiber are those that have relatively high tensile strength and can be meltspun into small diameter fibers. Preferred materials for scaffold fiber have relatively higher values for modulus of elasticity than materials used for media fibers.

The performance of the media can be measured by a compressibility-solidity factor ("CS Factor") which is determined as the multiple of the compression percent times the solidity percent. In both cases, lower numbers are generally preferred. A compression percent of 40 percent, multiplied by a solidity of 15 percent, gives a CS Factor of 600. A compression percent of 10 percent, along with a solidity percent of 10 percent, will provide a CS Factor of 100. Generally, a CS Factor of below 600 is desired. CS Factors of less than 500, less than 450, less than 400, and less than 350 are all suitable for certain implementations of the invention. CS Factors of less than 300 can be particularly desirable, as are CS Factors of less than 250, less than 200, and even less than 150. CS Factors of less than 150 are also desirable, in particular less than 125, less than 100, and less than 75.

Suitable materials and configurations of filter media and elements will now be described in greater detail, including a discussion of the media for removing fuel contaminant products (especially FDPs), followed by a discussion of various media configurations having additional media layers or areas for removing of both FDP contaminants and traditional contaminants, a discussion of filter element configurations, and a discussion of experimental results.

Media for Removal of Fuel Contamination Products (Including Fuel Degradation Products)

The present invention is directed, in part to various filter constructions that allow for removal of contaminants such as fuel degradation products, and in some implementations contaminants such as waxes, asphaltenes, sterol glucosides, steryl glucosides, and sterol glycosides. Such filter constructions can contain one or more layers or areas of filter media containing a mixture of two (or more) types of fibers: (1) a media fiber and (2) a scaffold fiber. These fibers are typically selected to include at least some melt blown fibers, optionally with the use of non-meltblown fibers.

Meltblown fibers are generally formed by extruding a molten thermoplastic material through a plurality of die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Meltblown processes are disclosed, for example, in U.S. Pat. No. 3,849,241 to Butin et al.; U.S. Pat. No. 4,100,324 to Anderson et al., U.S. Pat. No. 3,959,421 to Weber et al.; U.S. Pat. No. 5,652,048 to Haynes et al.; and U.S. Pat. No. 5,271,883 to Timmons et al.

Suitable thermoplastic polymers for forming the meltblown fibers include, but are not limited to, polyolefins, polycondensates (e.g., polyamides, polyesters, polycarbonates, and polyarylates), vinyl polymers, polyols, polydienes, polyurethanes, polyethers, polyacrylates, polycarbonates, polystyrenes, and so forth. Examples of suitable polyolefins include, by way of example only, polyethylene, polybutene and copolymers and/or blends thereof. As examples, the fibers can comprise ethylene polymers and copolymers thereof and more particularly can comprise copolymers of ethylene with alpha-olefins.

Additional examples of polymers suitable for making media fibers also include poly(1-pentene), poly(2-pentene), poly(3-methyl-1-pentene), poly(4-methyl-1-pentene), nylon, polybutylene, polyethylene terephthalate, polybutylene terephthalate, and so forth.

Additionally, thermoplastic elastomers are also suitable for use with the present invention such as, for example, ethylene-propylene rubbers, styrenic block copolymers, copolyester elastomers, polyamide elastomers and so forth. In a particular embodiment, the first layer of the nonwoven web comprises fibers of crystalline polymers having a crystallinity greater than 20% and still more desirably a crystallinity of about 30% or more and even still more desirably a crystallinity of about 50% or more. In an exemplary embodiment, the media fiber web can comprise a polyester polymer.

Polyester, and more particularly poly(butylene terephthalate) resin (PBT) can be used in accordance with the teachings of the present invention. PBT resins generally have good characteristics for meltblown processes. The polyester resins used to form the meltblown webs of the invention include an aromatic dicarboxylic acid (or derivative thereof), a linear diol, and at least one additional aliphatic branched or cyclic diol. The polyester resins may include poly(butylene terephthalate) based polymers (PBT) or poly(butylene napthalate) based polymers (PBN), where the resins are modified with one or more additional aliphatic diols.

The polyester copolymers produced according to the present invention should have properties suitable for meltblown processes and nonwoven applications. If the polyester used to make the meltblown webs is a terephthalate resin, it may have a melting point in the range of from 200-220° C. If the polyester used is a naphthalate resin, it may have a melting point in the range of from 220-240° C. The polyester resins may have an intrinsic viscosity (I.V.) in the range of from 0.5 to 0.8 dl/g. If the intrinsic viscosity of the polyester constituting the meltblown webs of this invention is lower than 0.5, the polymer produces molten fibers with melt strengths that are too low for attenuation—the fibers tend to break under the high velocity gas streams. Additionally, if the intrinsic viscosity is in excess of 0.8, the polymer is too viscous to be extruded through the die orifices.

Larger fibers can be achieved on conventional meltblowing assets by reducing the primary air temperature and pressure as well as lowering the formation height. The thickness or basis weight of the second layer can be increased as desired by increasing the number of consecutive meltblown banks altered to provide such fibers. It is noted that alteration of other parameters alone or in combination with the aforesaid parameters may also be used to achieve large fibers and/or thicker webs. Methods of making larger meltblown fibers are described in more detail in U.S. Pat. No. 5,639,541 to Adam and U.S. Pat. No. 4,659,609 to Lamers et al.; the entire contents of each of the aforesaid references are incorporated herein by reference. In a further aspect, it is possible to deposit more than one large fiber layer on the first media fiber layer.

The scaffold fiber layer comprises larger fibers of sufficient number and size so to create an open structure having improved strength relative to the first media fiber layer. Desirably the scaffold fiber layer has a significant number of fibers in excess of about 15 micrometers and still more desirably has a substantial number of fibers in excess of about 25 micrometers. In this regard, it is noted that the coarse fibers can comprise a plurality of smaller fibers having diameters between about 10 and about 35 micrometers and still more desirably an average fiber diameter of between about 12 micrometers and about 25 micrometers wherein the individual fibers "rope" or otherwise become length-wise bonded so as to collectively form large, unitary fibers or filaments. In calculating average fiber size, the length-wise bonded fibers are treated as a single fiber. The meltblown fiber can be used either as a media fiber or as a binder fiber, or both, depending upon the desired properties of the material.

Media Fiber

Media fiber is that fiber that provides primary filtration properties to the media, such as controllable pore size, permeability and efficiency. The media fiber used in accordance with the invention may be, for example, melt blown fiber, glass fiber, carbon fiber, ceramic fibers, polyester or cellulose.

Generally suitable media fibers should have an average diameter of less than 15 microns, more desirably less than 10 microns, and preferably less than 5 microns.

In embodiments, the filter media useful in the filter media packs of the invention contain media fibers in an amount corresponding to about 10% to 90% by weight of the total solids in the filter medium, or about 20 to 80% by weight of the total solids in the filter medium, or about 25% to 75% by weight of the total solids in the filter medium, or about 50% by weight of the total solids in the filter medium. In certain implementations the media fibers correspond to greater than 10% by weight of the total solids in the filter media, while in other implementations, the media fibers correspond to greater than 20% by weight of the total solids in the filter media, and in yet other implementations the media fibers correspond to greater than 50% by weight of the total solids in the filter media. In certain implementations the media fibers correspond to less than 75% by weight of the total solids in the filter media, while in other implementations, the media fibers correspond to less than 50% by weight of the total solids in the filter media, and in yet other implementations the media fibers correspond to greater than 25% by weight of the total solids in the filter media.

In some embodiments, a blend of more than one source of media fiber is employed, wherein the blend of more than one source of glass fiber is employed to form the total weight percent of media fiber in the filter medium. In some such embodiments, the blend of glass fiber sources is selected to control the permeability of the filter media. For example, in some embodiments, combining glass fibers from more than one source of media fiber having an average fiber diameter of about 0.3 to 0.5 micrometer, media fiber having an average fiber diameter of about 1 to 2 micrometers, glass fiber having an average fiber diameter about 3 to 6 micrometers, glass fiber with a fiber diameter of about 6 to 10 micrometers, and media fiber with fiber diameter of about 10 to 100 micrometers in varying proportions, including blends of two or more thereof, increases the permeability of the filter media pack. In some such embodiments, the glass fiber blends are selected to impart a controlled pore size, resulting in a defined permeability, to a filter medium.

In addition (or as an alternative to) to melt blown fibers, the media fiber can include glass fiber. Suitable media fiber comprises a glass fiber used in media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers. Such fiber is typically used as a diameter about 0.1 to 10 micrometers and an aspect ratio (length divided by diameter) of about 10 to 10,000. These commercially available fibers are characteristically sized with a sizing coating. Commercial sources for suitable glass materials include the following: Lauscha International, Evanite, Johns Manville, Owen Corning, and others. In addition to glass fibers, an alternative fiber suitable in some implementations for the media fiber comprises carbon fibers.

Generally suitable carbon fibers should have an average diameter of less than 25 microns, more desirably less than 15 microns, and preferably less than 10 microns. Commercial sources for suitable carbon materials include the following: Unitika, Kynol, and others.

Scaffold Fiber

The scaffold fiber provides support for the media fiber, and adds improved handling, strength, and resistance to compression to the media fiber. In certain implementations the scaffold fiber also provides improved processability during furnish formulation, sheet or layer formation and downstream processing (including thickness adjustment, drying, cutting and filter element formation).

The scaffold fiber may be, for example, a melt blown fiber.

Conventional meltblowing or meltspinning equipment can be used to produce such larger, coarse fibers by properly balancing the polymer throughput, diameter of the die tip orifice, formation height (i.e. the distance from the die tip to the forming surface), melt temperature and/or draw air temperature. As a specific example, the last bank in a series of meltblown fiber banks can be adjusted whereby the last meltblown bank makes and deposits a layer of scaffold fibers over the newly formed media fiber nonwoven web. With regard to making larger thermoplastic polyester fibers, by reducing the primary air temperature and/or lowering the formation height, production of larger, coarse fibers is achieved. The thickness or basis weight of the scaffold fiber layer can be increased as desired by increasing the number of consecutive meltblown banks altered to provide larger, coarse fibers. It is noted that alteration of other parameters alone or in combination with the aforesaid parameters may also be used to achieve scaffold fiber layers and/or webs. Methods of making such larger, coarse fibers are described in more detail in U.S. Pat. No. 4,659,609 to Larners et al. and U.S. Pat. No. 5,639,541 to Adam, the entire contents of the aforesaid references are incorporated herein by reference.

The scaffold fiber layer can be deposited co-extensively with the media fiber layer. In this regard, it will be appreciated that the scaffold fibers are not significantly drawn and/or oriented. Nevertheless, since the scaffold fibers are deposited upon the media fibers in a semi-molten state they form good inter-fiber bonds with the media fiber fibers as well as other coarse fibers and thereby provide a composite structure which has improved strength and resistance to pilling during handling, converting and/or use. Moreover, despite the formation of a layer having increased irregularity, polymeric globules and/or shot, the scaffold fiber layer forms an open structure that does not significantly decrease the filtration efficiency and/or create linting or other particulates detrimental to use of the same in filtration applications.

The scaffold fiber may also be a bicomponent fiber. As used herein, "bicomponent fiber" means a fiber formed from a thermoplastic material having at least one fiber portion with a melting point and a second thermoplastic portion with a lower melting point. The physical configuration of these fiber portions is typically in a side-by-side or sheath-core structure. In side-by-side structure, the two resins are typically extruded in a connected form in a side-by-side structure. Other useful morphologies include lobed bicomponent fibers, wherein the tips of the fibers have lobes that are formed from a lower melting point polymer than the rest of the fiber.

The use of the bicomponent fiber enables the formation of a media layer or filter element that can be formed with no separate resin binder or with minimal amounts of a resin binder that substantially reduces or prevents film formation from the binder resin and also prevents lack of uniformity in the media or element due to migration of the resin to a particular location of the media layer. The use of the bicomponent fiber can permit reduced compression, improved solidity, and increased tensile strength in the filter media and improves utilization of media fiber such as glass fiber and other sub-micron fiber materials that are added to the media layer or filter element.

The media fibers and scaffold fibers combine in various proportions to form a high strength material having substantial filtration capacity, permeability and filtration lifetime. Such a media can be made with optional secondary fibers and other additive materials. These components combine to form a high strength material having substantial flow capacity, permeability and high strength.

Bicomponent fibers may also be used as the scaffold fiber. Various combinations of polymers for the bicomponent fiber may be useful in the present invention, in an embodiment the first polymer component melts at a temperature lower than the melting temperature of the second polymer component and typically below 205° C. Further, the bicomponent fibers are typically integrally mixed and evenly dispersed with the media fibers. Melting of the first polymer component of the bicomponent fiber is necessary to allow the bicomponent fibers to form a tacky skeletal structure, which upon cooling, captures and binds many of the media fibers, as well as binds to other bicomponent fibers. In the sheath-core structure, the low melting point (e.g., about 80 to 205° C.) thermoplastic is typically extruded around a fiber of the higher melting (e.g., about 120 to 260° C.) point material.

In use, the bicomponent fibers typically have a fiber diameter of about 5 to 50 micrometers, often about 10 to 20 micrometers, and typically in a fiber form generally have a length of 0.1 to 20 millimeters or often have a length of about 0.2 to about 15 millimeters. Such fibers can be made from a variety of thermoplastic materials including polyolefins (such as polyethylenes), polyesters (such as polyethylene terephthalate, polybutylene terephthalate, polycyclohexylenedimethylene terephthalate), nylons including nylon 6, nylon 6,6, nylon 6,12, etc.

Bicomponent fibers are useful in forming mechanically stable, but strong, permeable filtration media. The bicomponent fibers useful in the filter assemblies of the invention are of a core/shell (or sheathed) morphology, side-by-side morphology, islands-in-the-sea morphology, or lobed morphology. The bicomponent fibers are made up of at least two thermoplastic materials having different melting points. In some embodiments, thermoplastic polymers useful in forming either the core or the sheath of the bicomponent fibers useful in filter media of the present invention include polyolefins such as polyethylene, polybutylene, poly-α-octene, and copolymers thereof including linear low density, low density, high density, ultra-high density, and other morphological and compositional designations; polytetrahaloethylenes such as polytetrafluoroethylene and polychlorotrifluoroethylene; polyesters such as polyethylene terephthalate, polybutylene terephthalate, or polyethylene naphthalate; polyvinyl acetate, polyvinyl alcohol, and copolymers thereof; polyvinyl halides such as polyvinyl chloride, polyvinylidene halides such as polyvinylidene chloride, polyvinylidene fluoride, and the like and copolymers thereof; polyacetals such as polyvinyl butyral, acrylic resins (polyacrylates) such as polymethylacrylate esters and polymethylmethacrylate esters and copolymers thereof including copolymers of acrylic acid and salts thereof; polyamides such as nylon 6, nylon 66, nylon 6,10, nylon 46, and the like and copolymers thereof; polystyrene and copolymers thereof; polyurethanes; polyureas; cellulosic resins, namely cellulose nitrate, cellulose acetate, cellulose acetate butyrate, ethyl cellulose, and the like; copolymers of any of the above materials, such as ethylene-vinyl acetate copolymers, ethylene-acrylic acid copolymers, styrene-butadiene block copolymers, KRATON® rubbers, and the like. In embodiments, a polyolefin/polyester sheath/core bicomponent fiber is employed whereby the polyolefin sheath melts at a lower temperature than the polyester core. In an embodiment, the bicomponent fiber comprises a polyester sheath and a polyester core. In other embodiments, two polyolefins, or two polyesters, two polyvinyl halide, two polyvinylidene halide, two polyamide polymers, or any other two polymers that are similar or identical chemically are employed as core and sheath, wherein compositional (e.g. the particular monomer composition mix used to synthesize the polymer, or the blockiness of the monomer concentration in a copolymer), molecular weight, or morphological differences such as degree of branching or degree of side chain crystallization and the like provide lower and higher melting or softening polymer materials.

In some embodiments, the lower melting point component of the bicomponent fibers is employed as the sheath in a core/sheath morphology (or shell in a core/shell morphology), as the lobes in a lobed morphology, as the "islands" in an islands-in-the-sea morphology, or as one side of a side-by-side morphology. The lower melting component provides a melt fusing capability to the formed filter media pack, wherein the nonwoven wet laid or air laid webs are heated to a temperature above the melting point or glass transition temperature of the lower melting component and below the melting point or glass transition temperature of the higher melting component. In embodiments, melt fusing is accomplished when the molten or softened fiber components contact other bicomponent fibers, as well as any other fibers and additives within the formed wet laid or air laid filter media pack. In such embodiments, when the temperature is subsequently reduced to at or below the intended end use temperature, the bicomponent fibers have become at least partially melt fused by virtue of the sheath (or lobe or side), while substantially retaining the nonwoven characteristics of loft, permeability, porosity, basis weight, thickness, and the like imparted by the air laid or wet laid process employed to form the media. These nonwoven characteristics are retained by virtue of the higher melting core or side of the bicomponent fiber that retains its fibrous morphology during melt fusing. Further, the melt fused bicomponent fiber imparts desirable properties, including reduced compression and increased tensile strength; the melt fused bicomponent fiber further improves utilization and retention of media fiber and other secondary fibers and/or additive materials in the filter media or filter assemblies of the invention.

In some embodiments, core/sheath bicomponent fibers known as Advansa 271P available from E. I. Dupont Nemours, Wilmington Del. is useful in forming both the high loft and low loft filter media useful in the filter assemblies of the invention. Other useful bicomponent fibers include the T-200 series of concentric core/sheath fibers available from Fiber Innovation Technology, Inc. of Johnson City, Tenn.; Kuraray N720, available from Engineered Fibers Technology, LLC of Shelton, Conn.; Nichimen 4080, available from Nichimen America Inc. of New York, N.Y.; and similar materials. All of these fibers demonstrate the characteristics of melt fusing as described above.

Spunbond fibers can also be used as the scaffold fibers. Spunbond fibers are often about 10 microns or greater in diameter. Spunbond webs (having an average fiber diameter less than about 10 microns) may be achieved by various methods including, but not limited to, those described in U.S. Pat. No. 6,200,669 to Marmon et al. and U.S. Pat. No. 5,759,926 to Pike et al. As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

Media Properties

The performance properties of the filter media are significantly impacted by controlling attributes relating to the fiber size, pore structure, solidity, and compressibility of the filter media. Generally, the use of a media that has relatively low solidity and low compressibility, while also having a small mean flow pore size but a large maximum flow pore size, results in an example media construction that can remove FDP compounds without premature plugging.

In general the media fiber has a much smaller diameter than the scaffold fiber. In example embodiments, the media fiber has an average diameter of less than 5 microns, while the scaffold fiber has an average diameter of greater than 5 microns. More typically, the media fiber will have an average diameter from 0.1 to 20 microns, and optionally from 0.1 to 15 microns. In some implementations the media fiber will have an average diameter from 0.4 to 12 microns, and in some implementations from 0.4 to 6.5 microns. Media fibers with an average diameter of less than 10 microns, less than 7.5 microns, less than 6.5 microns, and less than 5 microns are often desirable. The scaffold fiber will typically have a diameter from 5 to 40 microns, more typically from 7 to 20 microns, and often from 10 to 14 microns. In some implementations the scaffold fibers can have significantly larger diameters, including up to 100, 150, 250, 300, 350, 400 or 500 microns in various implementations. Note that the diameter of both the media fibers and the scaffold fibers can be variable. In some cases the fiber diameters will vary along their lengths, while more commonly fibers of different diameters will be incorporated.

A further characteristic of filter media made in accordance with the present invention, and in particular that portion of the media associated with sequestering FDPs (and related fuel contaminant products), is that it typically has a relatively low solidity level. As used herein, solidity is the solid fiber volume divided by the total volume of the filter medium at issue, usually expressed as a percentage. In a typical implementation, solidity of the filter media associated with sequestering FDPs is less than 15 percent, more typically less than 12 percent, and more frequently less than 10 percent. In certain embodiments the solidity is less than 9 percent, less than 8 percent, or less than 7 percent.

An additional characteristic of the filter media made in accordance with the present invention is that it is relatively incompressible, especially relative to the solidity of the media. Compressibility is the resistance (i.e.) to compression or deformation in the direction of fluid flow through the media. A suitable test for media compression is a compression force vs. distance test, wherein a stack of media is compressed under a load to determine compression percent. An example of such a test is as follows: A 2.54 centimeter diameter probe and a 5 kg load cell are used to compress a stack of media having a total thickness of 25 mm. The test is performed at a speed of 1 mm/sec, with a 30 mm start distance from the bottom, and a data trigger of 0.5 g. The end force target is 4,800 g. The media sample size can be 2.22 centimeter diameter circle, oriented with media samples to form a stack directly underneath the test probe. The pressure on the media in such implementations is approximately 1.24 kg/cm$^2$. The number of stacked samples used should be sufficient to have a total thickness of 25 mm, thus the total number of samples will vary depending upon individual thickness of the tested media material. The data is analyzed in terms of the following equation:

$$\text{compression percent} = t_2/t_1$$

wherein $t_1$=thickness from the bottom of stacked samples when force=0.5 grams, and $t_2$=thickness from bottom of stacked samples when force=4,800 g, with x equal to the distance the probe travelled during the test, which is the distance $t_1-t_2$. Suitable instruments for performing this test include, for example, a TA.XT2i Texture Analyzer from Stable Micro Systems utilizing Texture Expert Exceed software version 2.64.

The compressive resistance must be sufficient to maintain a material's thickness and thereby maintain its pore structure and filtration flow and particulate removal performance. Compressibility typical of the materials made by the invention are as follows: In a first example embodiment, the filter media containing the scaffold fiber and media fiber has a compressibility of less than 40 percent at a pressure of 1.24 kg/cm$^2$. In other implementations the filter media has a compressibility of less than 30 percent at a pressure of 1.24 kg/cm$^2$, less than 20 percent at a pressure of 1.24 kg/cm$^2$, and less than 10 percent at a pressure of 1.24 kg/cm$^2$. As noted above, in a typical implementation, solidity of the filter media associated with sequestering FDPs is less than 15 percent, more typically less than 12 percent, and more frequently less than 10 percent. In certain embodiments the solidity is less than 9 percent, less than 8 percent, or less than 7 percent.

In an example embodiment of the invention, the filter media comprises various sized melt blown fibers laminated on the upstream side of cellulose media, with the cellulose also serving a dual role as a hard particle filter and a support for the thermally bonded glass. The melt blown media functions to remove the FDPs in a fashion such that the FDPs are removed while premature plugging of the cellulose layer is avoided. This improved performance is achieved, in part, by selecting the fiber mixture so that the media has a relatively low solidity, while retaining a relatively low compressibility.

Typically some of the fibers are relatively thin and in high concentrations while other fibers are relatively thick and in lower concentrations, result in a media having small mean flow pore sizes, but also typically relatively high maximum pore sizes. The use of a media that has relatively low solidity and low compressibility, while also having a small mean flow pore size but a high maximum flow pore size, results in a media construction that effectively removes FDP compounds without premature plugging. Preferred materials for the media fiber are those that have relatively high tensile strength and can be meltspun into small diameter fibers. Preferred materials for scaffold fiber have relatively higher values for modulus of elasticity than materials used for media fibers. Identification of suitable materials based on relative tensile strength and modulus of elasticity can be enhanced by comparison of the materials disclosed in "The Science And Engineering of Materials" by Donald R. Askeland, including in "Table 15-6: The Mers and Properties of Selected Thermoplastics Produced by Addition Polymerization".

The performance of the media can be measured by a compressibility-solidity factor ("CS Factor") which is determined as the multiple of the compression percent times the solidity percent. In both cases, lower numbers are generally preferred. A compression percent of 40 percent, multiplied by a solidity of 15 percent, gives a CS Factor of 600. A compression percent of 10 percent, along with a solidity of 10 percent, will provide a CS Factor of 100. Generally, a CS Factor of below 600 is desired. CS Factors of less than 500, less than 450, less than 400, and less than 350 are all suitable for certain implementations of the invention. CS Factors of less than 300 can be particularly desirable, as are CS Factors of less than 250, less than 200, and even less than 150. CS Factors of less than 150 are also desirable, in particular less than 125, less than 100, and less than 75.

Figure 2:
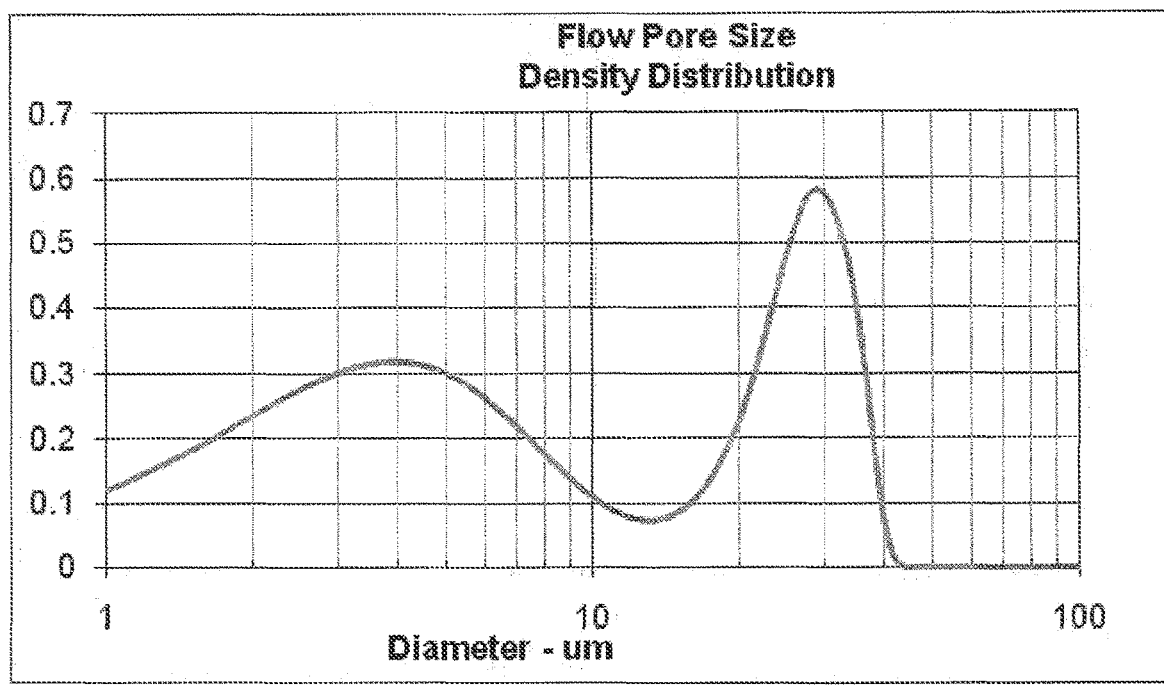
FIG. 2 is a graph of pore density versus diameter to show mode pore size for a media.
Figure 3:
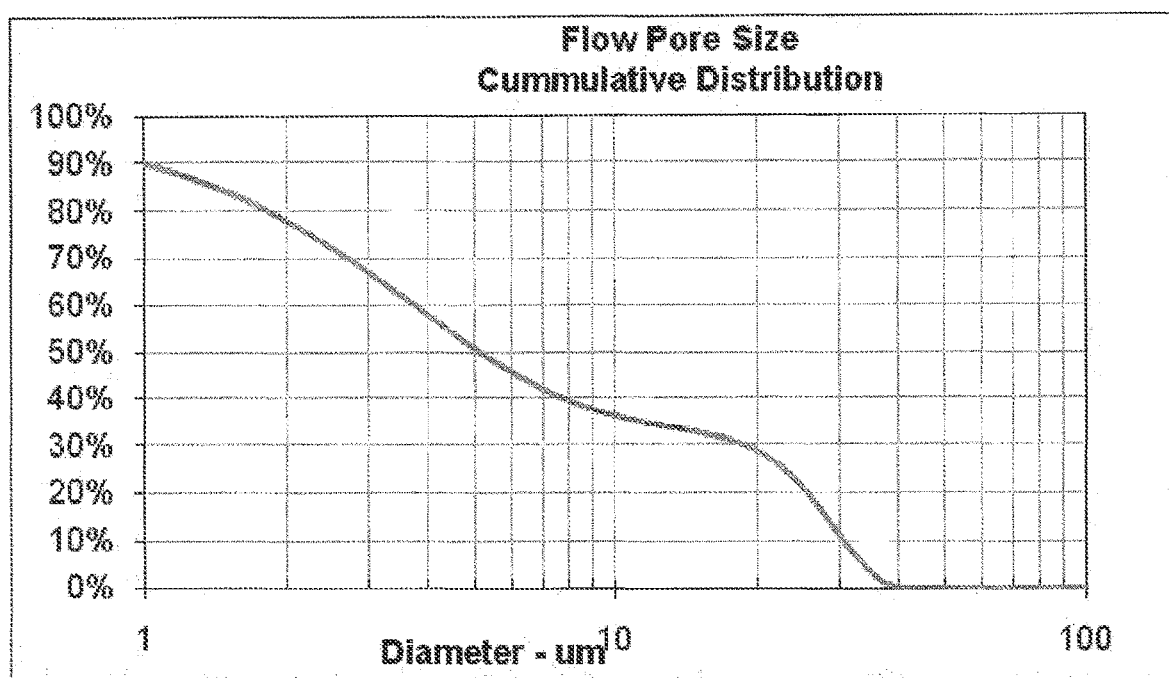
FIG. 3 is a graph of cumulative pore size distribution to show mean flow pore size for a media.

Further metrics by which the properties of the media associated with sequestering FDPs (and optionally other similar fuel contaminant products) are described relates to the pore structures of the media. In general, it is possible to characterize the properties of a porous media in terms of such parameters as mean flow pore, mode flow pore, and max flow pore. The "mode pore size" is the most frequently occurring pore size in a material. FIG. 2 shows Flow Pore Size Density Distribution of an example media material. The "mode pore size" is shown as the highest peak of the curve at approximately 30 microns. "Mean pore size" is the average size of the pores in the material, and "cumulative flow pore size" is a measure of the total percentage of flow that passes through the media as a function of pore diameter, determined using a capillary flow porometer instrument. "Mean flow pore size" is defined as the pore size where 50% of cumulative flow passes through the media. "Porosity" is defined as the amount of void space in a material. FIG. 3 shows Flow Pore Size Cumulative Distribution. The "mean flow pore size" (indicated by the arrow) is the point at which the curve intersects 50% on the y-axis.

With regard to pore size, the portion of the filter media primarily responsible for removal of FDPs and related contaminants will typically have a mean flow pore size of 5 to 20 microns, or 5 to 10 microns. Suitable mean flow pore sizes include less than 20 microns less than 15 microns, and less than 10 microns. The portion of the filter media primarily responsible for removal of FDPs and related contaminants will typically have a mode flow pore size of from 10 to 50 microns, from 20 to 40 microns, or from 25 to 35 microns. Suitable mode flow pore sizes include, for example, greater than 10, greater than 15, greater than 20 and greater than 25 microns. With regard to max flow pore size, the portion of the filter media primarily responsible for removal of FDPs and related contaminants will often have a max flow pore size greater than that of cellulose or melt blown media. Suitable max flow pore sizes include greater than 10 microns, preferably, greater than 20 microns, and in some implementations greater than 30 microns. In example implementations the max flow pore size is from 20 to 50 microns, or from 25 to 45 microns.

Typically, the mode pore size is larger in the upstream portion than in the downstream portion of the filter media, and the mean (or average) pore size is smaller in the upstream portion than in the downstream portion. In accordance with the teachings of the present invention, it is desirable in general to have at least a portion of the media with small mean flow pores, while also having a large max flow pore. The ratio of max pore size to mean flow pore is often at least 2.5, optionally at least 5.0, and in some implementations greater than 7.5. In certain embodiments, where the mean flow pore is very small and the max flow pore relatively high, this ratio may be greater than 10, and optionally greater than 12.5 or 15. High numbers reflect a wider particle size distribution, which can provide for improved removal of FDP (and related) contaminants.

Additional Fibers

The media layer for removal of FDPs and similar fuel contaminant products can contain secondary fibers made from a number of both hydrophilic, hydrophobic, oleophilic, and oleophobic fibers. These fibers cooperate with the glass fiber and the bicomponent fiber to form a mechanically stable, but strong, permeable filtration media that can withstand the mechanical stress of the passage of fluid materials and can maintain the loading of particulate during use. Secondary fibers are typically monocomponent fibers with a diameter that can range from about 0.1 to about 50 micrometers and can be made from a variety of materials. One type of secondary fiber is a scaffold fiber that cooperates with other components to bind the materials into a sheet. Another type of secondary fiber is a structural fiber that cooperates with other components to increase the tensile and burst strength of the materials in dry and wet conditions. Additionally, the scaffold fiber can include fibers made from such polymers as polyvinyl chloride and polyvinyl alcohol. Secondary fibers can also include inorganic fibers such as carbon/graphite fiber, metal fiber, ceramic fiber and combinations thereof.

Secondary thermoplastic fibers include, but are not limited to, polyester fibers, polyamide fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polypropylene fibers are generally not desirable, because they have lower resistance to fuels and because they have a relatively low modulus. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. The preferred thermoplastic fibers are polyamide and polyethylene terephthalate fibers, with the most preferred being polyethylene terephthalate fibers.

Staple fibers are typically added to a nonwoven web in solidified form (such as by the exemplary process described later) as opposed to being meltblown into the web. Often, they are made by processes such that the fiber diameter more closely resembles the size of the orifice through which the fiber is extruded (compared to e.g. meltblown fibers).

The staple fibers are typically synthetic polymeric materials. Their composition may be chosen so that they can be melt-bonded to each other and/or to the meltblown fibers during a typical molding process (such as used to form a shaped respirator body). Regardless of their process of manufacture or composition, staple fibers are typically machine cut to a specific predetermined or identifiable length. The staple fibers will typically have a length of about 0.1 to 8 cm, more preferably about 0.1-2.0 cm. The average geometric fiber diameter for the staple fibers is generally greater than about 5 µm on average, and in various embodiments can be greater than 10, 20, 30, 40, 50, 100, 150, 250, 300, 350, 400 or 500 µm depending upon whether its use, and whether it is providing media fiber functionality or scaffold fiber functionality, or both.

Suitable staple fibers may be prepared from polyethylene terephthalate, polyester, polyethylene, polypropylene, copolyester, polyamide, or combinations of one of the foregoing. If bondable, the staple fibers typically retain much of their fiber structure after bonding. The staple fibers may be crimped fibers like the fibers described in U.S. Pat. No. 4,118,531 to Hauser. Crimped fibers may have a continuous wavy, curly, or jagged profile along their length. The staple fibers may comprise crimped fibers that comprise about 10 to 30 crimps per cm. The staple fibers may be single component fibers or multi-component fibers.

The different components may be different types of polymers (e.g. polyester), or may be the same type of polymer but with different melting points. The multi-component fibers may be bicomponent fibers that have a coextensive side-by-side configuration, a coextensive concentric sheath-core configuration, or a coextensive elliptical sheath-core configuration.

Configurations Containing Multiple Layers or Multiple Functional Areas

As noted above, the upstream filter material selected for sequestering FDPs (containing media fiber and scaffold fiber, such as glass fiber and bicomponent fiber) is often combined with a downstream filter material. This downstream filter material is generally selected for favorable removal of particulate contaminants. The downstream portion may comprise, for example, cellulose. The difference between the ability of the upstream portion and downstream portion to attract various contaminants, combined with the pore size distribution of the upstream and downstream portions, allow the filter media of the present invention to effectively remove a range of contaminants without premature plugging the filter.

The upstream (for example, bicomponent fiber and polyester meltblown fiber) portion of the media typically has a smaller mean flow pore size than the downstream (for example, cellulose) portion, but this smaller average pore size is often combined with a larger mode pore size on the upstream portion, which can be useful for improving filter loading with certain contaminants, in particular fuel degradation products. Typically, the mode (or most common) pore size is larger in the upstream portion than in the downstream portion, and the mean (or average) pore size is smaller in the upstream portion than in the downstream portion.

The upstream portion may also have its own pore size variance, characterized at least by different pore sizes at different depths of the upstream portion. On the "top" of the upstream portion, the mode pore size is optionally increased. For some media, the downstream mode pore size of the upstream portion is significantly greater than the mode pore size of the downstream portion, which is typically cellulose. In some embodiments, the mode pore size of the upstream portion is greater than the mode pore size of the downstream portion. For example, the mode pore size of the upstream portion may be at least 20 percent greater than the mode pore size of the downstream portion in some implementations, and at last 40 percent greater than the mode pore size of the downstream portion in other implementations.

In an example embodiment, the mode pore size of the upstream portion is at least 20 percent greater than the mode pore size of the downstream portion; and the mean flow pore size of the upstream portion is less than 90 percent of the mean pore flow size of the downstream portion. It will be appreciated that the downstream portion may contain fiber having an average diameter or cross-section greater than the average diameter of the media fiber in the upstream portion. In some embodiments, the mode pore size of the upstream portion is greater than the mode pore size of the downstream portion. For example, the mode pore size of the upstream portion may be at least 40 percent greater or at least 60 percent greater than the mode pore size of the downstream portion. In some embodiments, the mean flow pore size of the upstream portion is less than the mean pore flow size of the downstream portion. For example, the mean flow pore size of the upstream portion may be less than 70 percent or less than 50 percent of the mean pore flow size of the downstream portion.

Media fiber diameter may also be selected to improve performance between the upstream and downstream portions. In one embodiment, the upstream portion contains media fiber having an average diameter of less than 10 microns based upon total fiber count; and the downstream portion contains media fiber having an average diameter different than the diameter of the media fiber in the upstream portion. In one embodiment, the media fiber of the upstream portion has an average diameter of less than 5 microns. Generally, the downstream portion contains fiber having an average diameter or cross-section greater than the average diameter of the media fiber in the upstream portion. The upstream portion may comprise, for example, glass fiber, scaffold fiber, or bicomponent fiber. In some embodiments, the downstream portion comprises cellulose, polymeric fibers such as polyester, or a combination thereof.

In one embodiment, the upstream portion contains media fiber having an average diameter of less than 10 microns based upon total fiber count; and the downstream portion contains media fiber having an average diameter different than the average diameter of the media fiber in the upstream portion; wherein the mode pore size of the upstream portion is at least 20 percent greater than the mode pore size of the downstream portion; and wherein the mean flow pore size of the media in the upstream portion is less than 90 percent of the mean pore flow size of the media in the downstream portion.

In some embodiments, the filter for filtering liquids comprises an upstream portion comprising media having a porosity of at least 50 percent, the media comprising a media fiber and a scaffold fiber having an average diameter greater than the media fiber; and a downstream portion comprising cellulose. The upstream portion may comprise carbon or glass fiber. In one embodiment, the media fiber of the upstream portion has an average diameter of less than 5 microns. In another embodiment, the media fiber of the upstream portion has an average diameter of less than 15 microns. In some embodiments, the mode pore size of the upstream portion is greater than the mode pore size of the downstream portion. For example, the mode pore size of the upstream portion may be at least 20 percent or at least 40 percent greater than the mode pore size of the downstream portion.

In another embodiment, the invention is directed to a filter media comprising an upstream portion containing fibers selected from carbon and meltblown fibers; and a downstream portion comprising cellulose; wherein the mode pore size of the upstream portion is at least 20 percent greater than the mode pore size of the downstream portion; and wherein the mean flow pore size of the upstream portion is less than 90 percent of the mean pore flow size of the downstream portion. It will be appreciated that the downstream portion may contain fiber having an average diameter greater than the average diameter of the media fiber in the upstream portion. In some embodiments, the mode pore size of the upstream portion is greater than the mode pore size of the downstream portion. For example, the mode pore size of the upstream portion may be at least 40 percent greater or at least 60 percent greater than the mode pore size of the downstream portion. In some embodiments the mean flow pore size of the upstream portion is less than the mean pore flow size of the downstream portion. For example, the mean flow pore size of the upstream portion may be less than 70 percent or 50 percent of the mean pore flow size of the downstream portion.

In some embodiments, the upstream filter portion loads fuel degradation products at a level of capture of at 50 percent greater than the downstream filter portion. In some embodiments, the first filter portion loads fuel degradation products at a level of capture of at least 100 percent greater than the second filter portion. In some embodiments, the first filter portion loads fuel degradation products at a level of capture of at least 200 percent greater than the second filter portion. The percentage may be normalized for media volume or for media surface area.

In some embodiments, low temperature crystalline polymer powder is used to laminate the synthetic and cellulose media together so as to make the composite media easily manufacturable into a number of different filter element configurations. Other methods of laminating the media layers together such as adhesive lamination or thermal bonding means are possible as well.

Figure 4A:
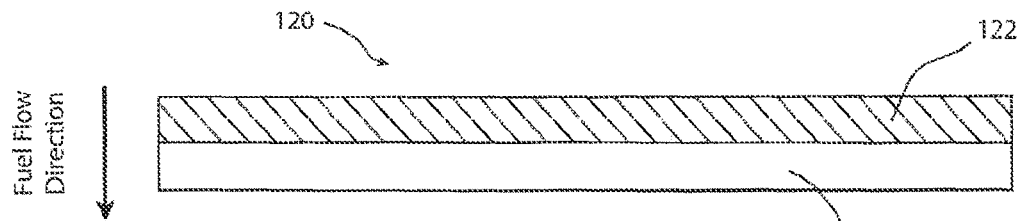
FIG. 4A is a cross sectional schematic view of a media construction made in accordance with an implementation of the invention.

In reference now to FIG. 4A to 4D, example configurations for filter media constructions are shown, In these cross sectional schematic diagrams, only the basic positioning of the media components are described, and it will be understood that these figures are not drawn to scale. It will also be understood that the figures are simplifications of the media constructions, and that they are alternative embodiments, but non-limiting as to the types of constructions possible under the present invention. FIG. 4A is a cross sectional schematic view of a media construction made in accordance with an implementation of the invention, showing a two layer construction. In this example embodiment, the media construction 120 includes a first portion containing upstream media 122 and a second portion containing downstream media 124. The upstream media can be, for example a combination of glass media fiber and bicomponent scaffold fiber. The downstream portion can be, for example, cellulose media.

Figure 4B:
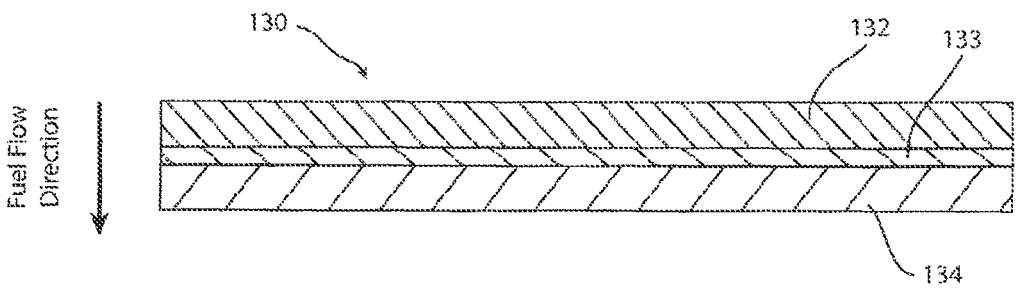
FIG. 4B is a cross sectional schematic view of a second media construction made in accordance with an implementation of the invention.

FIG. 4B is a cross sectional schematic view of another media construction made in accordance with an implementation of the invention, showing a three layer construction. In this example embodiment, the media construction 130 includes first and second portions containing upstream media 132 and 133, plus a third portion containing downstream media 134. The upstream media portions can be, for example a combination of glass media fiber and bicomponent scaffold fiber. In some embodiments these upstream media portions 132, 133 can have different properties from one another, such as different pore sizes and distributions. It is not necessary that both layers (or portions if not in discrete layers) remove FDPs or similar contaminants, as long as at least one layer or portion do so. The downstream portion can be, for example, cellulose media. Further embodiments can have, for example, additional upstream and downstream layers.

Figure 4C:
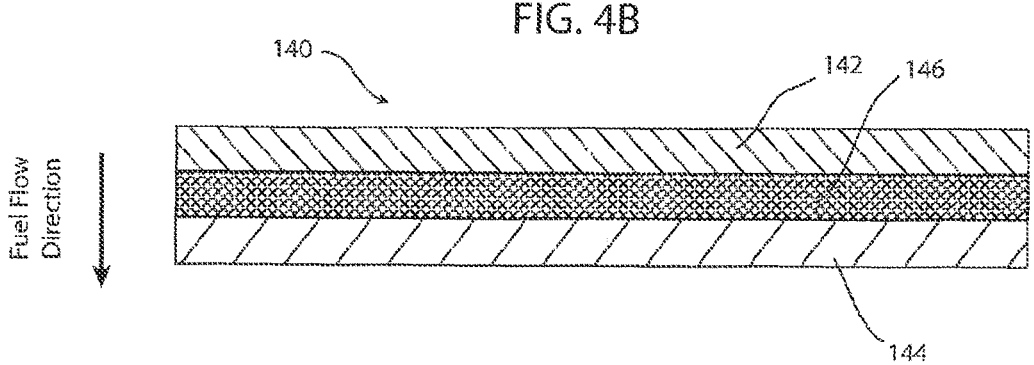
FIG. 4C is a cross sectional schematic view of a third media construction made in accordance with an implementation of the invention.

FIG. 4C is a cross sectional schematic view of a media construction made in accordance with an implementation of the invention showing a two layer construction with a spacer between media layers. In this example embodiment, the media construction 140 includes a first portion containing upstream media 142, a second portion containing downstream media 144, and a spacer 146 between the upstream and downstream portions 142, 144. The upstream media can be, for example, a combination of glass media fiber and bicomponent scaffold fiber. The downstream portion can be, for example, cellulose media. The spacer 146 can be, for example, a non-filtering scrim material.

Figure 4D:
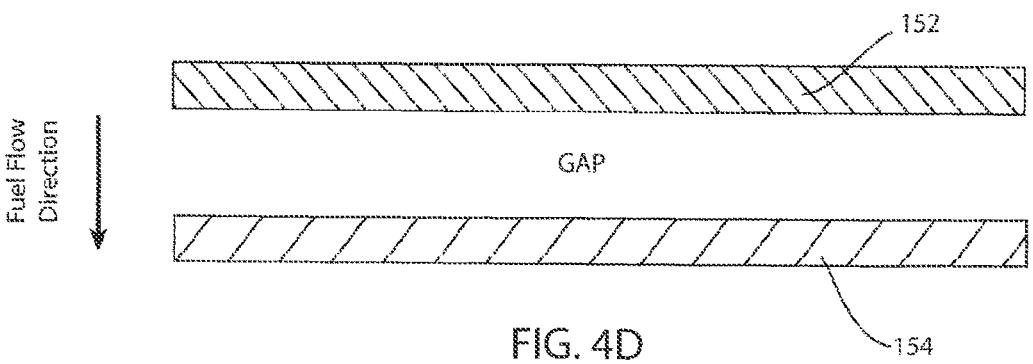
FIG. 4D is a cross sectional schematic view of a fourth media construction made in accordance with an implementation of the invention.

FIG. 4D is a cross sectional schematic view of a media construction made in accordance with an implementation of the invention wherein the upstream portion 152 and downstream portion 154 are further separated from one another by a gap. The upstream media can be, for example a combination of meltblown media fiber and bicomponent scaffold fiber. The downstream portion can be, for example, cellulose media. The gap can be relatively small, or relatively large. In this embodiment, the functional orientation of the two media is important: that one portion media be positioned upstream of the other portion. It will be understood support materials can be placed intermediate these two portions 152, 154.

Figure 5:
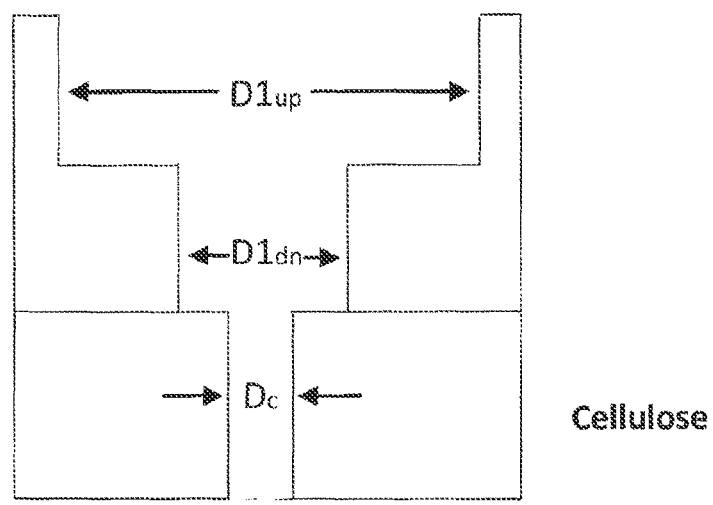
FIG. 5 is a schematic representation of a cross section of a portion of a filter structure according to one embodiment of the invention, showing relative pore sizes.

FIG. 5 illustrates the pore relationship of the media in an example embodiment of the invention, wherein the upstream portion comprises synthetic bicomponent-glass media and the downstream portion comprises cellulose. In particular, a layered structure of the present invention is shown in this example implementation, wherein the pore size can vary from wide open in the upstream portion to much smaller in the downstream portion where fine particulate filtration occurs. The upstream portion may comprise two or more layers with different pore sizes as is shown here. However, the mode pore size of the cellulose is smaller than the mode pore sizes of both portions of the depicted upstream portion.

A filter with a structure where the media pores are smaller on the downstream side than on the upstream side is often helpful. In other words, the porous structure is denser going from upstream to downstream side. As a result, the particles or contaminants to be filtered are able to penetrate to varying depths dependent on particle size. This causes the particles or contaminants to be distributed throughout the depth of the filter material, reducing the increase in pressure drop, and extending the life of the filter. In one embodiment, the pore sizes change by steps, as in FIG. 7. In another embodiment, the size of the pores gradually increases from smaller on the downstream side to larger on the upstream side.

Figure 6:
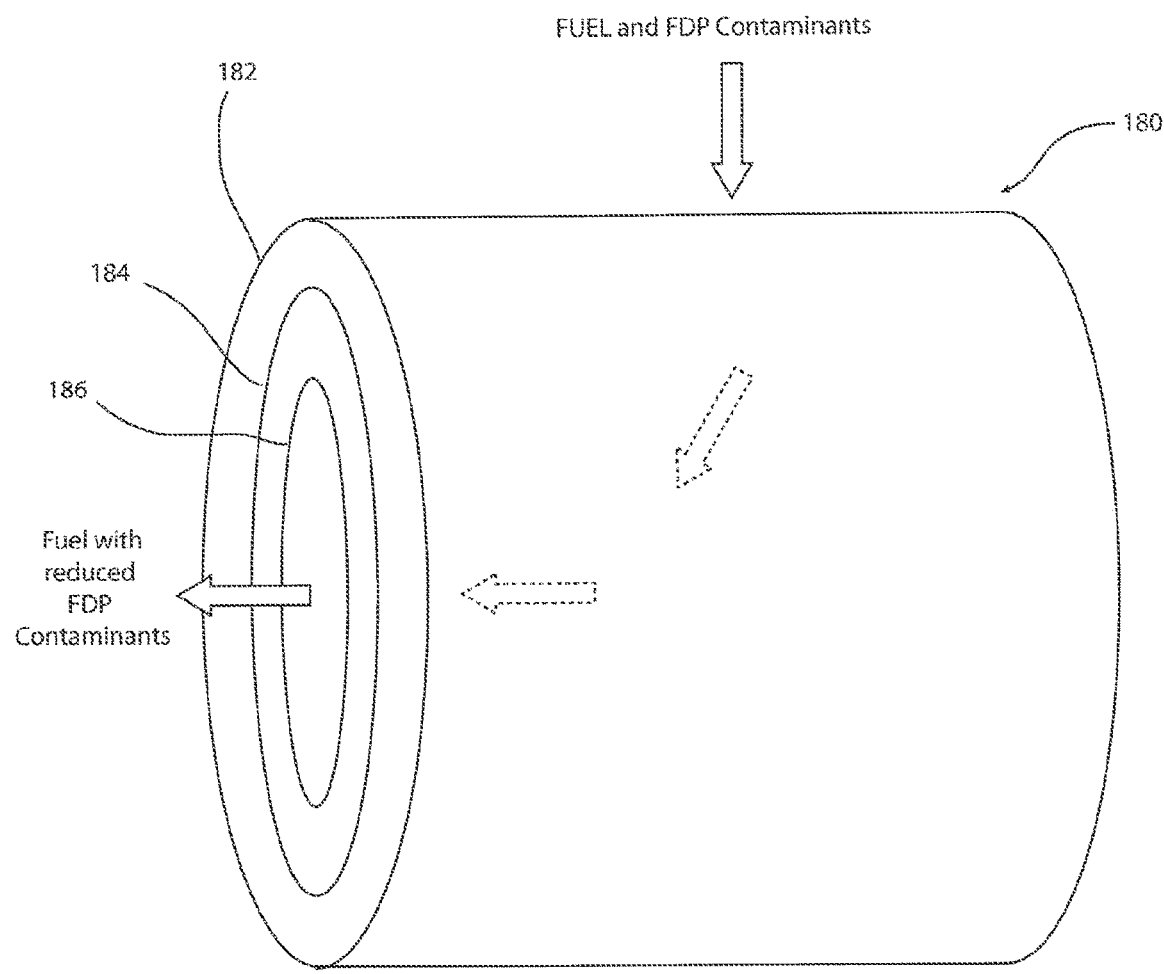
FIG. 6 is a multi-stage fuel filter according to one embodiment of the present invention.

FIG. 6 shows an example of one embodiment of a multi-stage fuel filter 180, having concentric layers of media 182, 184, 186. The concentric layers can comprise layers of media and scaffold fibers with varying pore dimensions from the exterior to the interior. Generally the mean flow pore size will get smaller from the outer layers 182 to the inner layers 186. FDPs and other similar products have the tendency to adsorb to the outer media surface and create a layer or film across the media. The agglomeration of the degradation products starts to fill the pores. The higher number of large pores in the upstream media allows the outer media to capture and store the degradation products without plugging as quickly. The tighter downstream layer is designed to have high efficiency for particles. This application incorporates by reference in its entirety U.S. patent application Ser. No. 13/027,119, filed Feb. 14, 2011, and entitled "Liquid Filtration Media, Filter Elements, and Methods".

It will be appreciated that, although the implementation of the invention described above is directed to the removal of FDPs from fuel streams, such as the fuel tanks of diesel engines or bulk storage tanks, the present device may be used in other filter applications and is not limited to the removal of FDPs. Embodiments of this invention would also be suitable for removing numerous contaminants of a hydrocarbon fluid chemistry that include such contaminants as waxes, asphaltenes, sterol glucosides, steryl glucosides, sterol glycosides and fuel degradation products. The contaminants can comprise, for example, deformable particles, non-deformable particles, and mixtures of deformable and non-deformable particles. Hydrocarbons such as lube and hydraulic oil may also be filtered using the present invention.

While the present invention has been described with reference to several particular implementations, those skilled in the art will recognize that many changes may be made hereto without departing from the spirit and scope of the present invention.

We claim:

1. A filter for filtering liquid fuels, the filter comprising:
    filter media configured and arranged for placement in a liquid fuel stream, the filter media comprising an upstream media layer and a downstream media layer, the upstream media layer comprising a mixture of:
    a) media fiber; and
    b) scaffold fiber having an average diameter greater than the media fiber;
    wherein the upstream media layer has a mean flow pore size of less than 20 microns and is smaller than the mean flow pore size of the downstream media layer,
    wherein the mode pore size of the upstream media layer is from 10 to 50 microns and is at least 40 percent greater than the mode pore size of the downstream media layer; and
    wherein the media fiber and scaffold fiber both are melt-blown fibers; and
    the downstream media layer comprising cellulose.

2. The filter for filtering liquid fuels of claim 1, wherein the media fiber has an average diameter of less than 5 microns.

3. The filter for filtering liquid fuels of claim 1, wherein the filter media has a Compressibility Solidity Factor of less than 600.

4. The filter for filtering liquid fuels of claim 1, wherein the filter media has a solidity of less than 12 percent.

5. The filter for filtering liquid fuels of claim 1, wherein the filter media has a compressibility of less than 40 percent at a pressure of 1.24 kg/cm$^2$.

6. The filter for filtering liquid fuels of claim 1, wherein the filter media has a max flow pore size at least 200 percent greater than the mean flow pore size.

7. The filter for filtering liquid fuels of claim 1, wherein the filter media has a mode flow pore size of at least 20 microns.

8. A filter for filtering liquid fuels, the filter comprising:
    filter media configured and arranged for placement in a liquid fuel stream, the filter media comprising an upstream media layer and a downstream media layer, the upstream media layer comprising a mixture of:
    a) media fiber; and
    b) scaffold fiber having an average diameter greater than the media fiber;
    wherein the upstream media layer has a mean flow pore size of less than 20 microns and is smaller than the mean flow pore size of the downstream media layer,
    wherein the mode pore size of the upstream media layer is from 10 to 50 microns and is at least 40 percent greater than the mode pore size of the downstream media layer;
    wherein the media fiber and scaffold fiber both are melt-blown fibers;
    wherein the media fiber has an average diameter of less than 5 microns; and
    wherein the filter media has a Compressibility Solidity Factor of less than 60; and
    the downstream media layer comprising cellulose.

9. The filter for filtering liquid fuels of claim 8, wherein the filter media has a solidity of less than 12 percent.

10. The filter for filtering liquid fuels of claim 8, wherein the filter media has a compressibility of less than 40 percent at a pressure of 1.24 kg/cm$^2$.

11. The filter for filtering liquid fuels of claim 8, wherein the filter media has a max flow pore size at least 200 percent greater than the mean flow pore size.

12. The filter for filtering liquid fuels of claim 8, wherein the filter media has a mode flow pore size of at least 20 microns.

* * * * *